United States Patent [19]

Crano et al.

[11] 3,718,711
[45] Feb. 27, 1973

[54] POLYCHLORAL HOMOPOLYMERS CONTAINING POLYETHERS, POLYOLEFINS, OF POLYURETHANES

[75] Inventors: John C. Crano, Akron, Ohio; Gerald M. Trenta, Norman, Okla.

[73] Assignee: PPG Industries, Inc., Pittsburgh, Pa.

[22] Filed: May 24, 1971

[21] Appl. No.: 146,522

[52] U.S. Cl..................260/823, 260/67 R, 260/858, 260/887, 260/888, 260/889, 260/892, 260/897 R, 260/901
[51] Int. Cl. ..............................................C08d 9/02
[58] Field of Search...........260/858, 823, 897 R, 887

[56] References Cited

UNITED STATES PATENTS 3,328,493   6/1967   Larrison................................260/929
3,417,056   12/1968   Pinazzi................................260/852
3,454,527   7/1969   Vogl........................................260/67
3,668,184   6/1972   Vogl........................................260/67

FOREIGN PATENTS OR APPLICATIONS 1,911,643   9/1970   Germany.............................260/2.5

Primary Examiner—Paul Lieberman
Attorney—Chisholm and Spencer

[57] ABSTRACT

A polymer blend alloy comprising polychloral and an elastomer is disclosed. The polymer blend alloy is characterized by the presence of a single solid phase when viewed under an optical microscope at a magnification of 1,000 times and is particularly tough and durable. This chloral polymer is produced by polymerizing chloral in the presence of a dissolved elastomer.

16 Claims, No Drawings

POLYCHLORAL HOMOPOLYMERS CONTAINING POLYETHERS, POLYOLEFINS, OF POLYURETHANES

BACKGROUND

Chloral, or trichloroacetaldehyde, is a relatively low-cost, chlorine-rich commodity. Heretofore, polymers of chloral have been characterized by low tensile and impact strength.

SUMMARY OF INVENTION

It has now been found that polymer alloy blends comprising polychloral and one or more elastomers provide a tough, self-extinguishing composition. The polychloral of this invention is characterized by its flame retardancy, durability, good tensile strength, good impact resistance, and good resistance to most solvents and chemicals.

It appears that the polychloral polymer blend alloy of this invention has as its major polymeric constituent a polychloral having the repeating units:

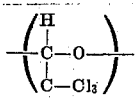

The polychloral having these repeating units is in intimate physical contact with the polymeric elastomer molecules. The elastomer molecules appear to be substantially uniformly dissolved in and dispersed throughout the composition. In one preferred composition of this invention, the polymer blend alloy is characterized by having but one solid phase as observed at a magnification of 1,000 times.

In one exemplification, such polymer alloy blends may be obtained by polymerizing chloral (trichloroacetaldehyde) in the presence of a solution of another, chemically different polymer, preferably an elastomer such as an elastomeric polyolefin, polyether, or polyurethane. The polychloral polymer blend alloy is made by first preparing a solution of chloral, the second polymer, and an initiator, preferably free of any solid phase. The reaction solvent can be either the chloral itself or another solvent in which the chloral and the second polymer are mutually soluble to the extent necessary for the preparation of the alloy blends herein contemplated. The monomeric chloral is then polymerized in the presence of the second polymer solute such that a polymer blend alloy results.

DESCRIPTION OF INVENTION

In the preferred exemplification, the polychloral composition of this invention is a polymer blend alloy. When a sample of the polychloral composition of this invention is examined under an optical microscope at a magnification of 1,000 times, only a single solid phase is observed.

Based on the polymer content thereof, the polymer blend alloy of this invention comprises from about 85 weight percent to about 99 weight percent of a homopolymer having the repeating unit:

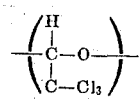

and from about 15 weight percent to about 1 weight percent of an elastomer substantially uniformly dispersed therein and in intimate contact therewith.

The upper concentration of elastomer in the solid polymer blend alloy is approximately equal to the solubility of the elastomer in liquid chloral, typically from about one weight percent elastomer to about 15 weight percent elastomer based on the total weight of elastomer and chloral. At concentrations of elastomer in the polymer blend alloy above the solubility of the elastomer in liquid chloral, the excess elastomer may be present as globules or droplets, thereby giving rise to an elastomer rich second phase.

Solid polychloral materials may also be prepared having a weight percentage of elastomer greater than the solubility of the elastomer in liquid chloral. Such materials will be multiphase systems. One of the phases will be a polymer blend alloy of chloral and the elastomer, wherein the weight percentage of the elastomer will be approximately equal to the solubility of the elastomer in liquid chloral. The other phase will have as its major constituent the elastomer. Such a solid multiphase system having as one of its phases a chloral-elastomer polymer blend alloy and as another of its phases an elastomer rich phase is contemplated by this invention.

Also contemplated by this invention are multiphase systems wherein one of the phases is a polymer blend alloy of polychloral and an elastomer and the other phase or phases include coloring agents, flame retardants, fibers, extenders, fillers, and the like.

Elastomers as used herein define those organic polymeric materials having a Young's Modulus of from $10^6$ to $10^8$ dynes per square centimeter. The preferred elastomers have a solubility in liquid chloral in excess of 1 weight percent. Such materials are polymeric and include polyolefins, such as polymers of alkenes, copolymers of alkenes, polymers of conjugated dienes and copolymers of conjugated dienes, polyurethanes, polyethers, and polyether.

Typical elastomers that are copolymers of conjugated dienes include styrene-butadiene, acrylonitrile-butadiene, ethylene-butadiene, isobutylene-isoprene, isoprene-acrylonitrile, and propylene-butadiene.

Elastomers that are polymers of conjugated dienes include polybutadiene, polychloroprene, and polyisoprene. Those that are copolymers of alkenes include ethylene-propylene and ethylene-vinyl acetate. Elastomers that are polymers of alkenes include polyacrylics (as polymethylacrylate) and polyisobutylene. Additionally, natural rubber may be used.

The preferred polyolefinic elastomers are soluble in liquid chloral by an amount in excess of one percent by weight. The contemplated polyolefinic elastomers have a modulus of elasticity of from about $10^6$ dynes per square centimeter to about $10^8$ dynes per square centimeter, and a molecular weight of from about $10^4$ to about $10^6$, and preferably from about $10^5$ to about $10^6$. Polymer blend alloys of polychloral and polyolefins will typically have from one to 15 weight percent polyolefin based on total weight of polyolefin and polychloral.

Alternatively, elastomeric polyurethanes may be used as the elastomeric constituent in the polymer blend alloy of this invention. Inasmuch as polyurethane elastomers may be prepared by the methods described, for example, in J. H. Saunders and K. C. Frisch, *Polyurethanes: Chemistry and Technology, Part I: Chemistry*, John Wiley & Sons, New York (1962), at pages 273 and 274, by the reaction of a long chain diol (as a polyether or polyester) with an excess of a diisocyanate, and the subsequent reaction of the prepolymer thereby formed with a chain extender (as a diol or diamine) it is customary to characterize a polyurethane by its constituent precursors. For example, a polyurethane may be characterized by the identity and approximate molecular weight of the polyester or polyether, the identity of the diisocyanate, the relative proportion of isocyanate groups in the diisocyanate to hydroxyl groups in the long chain diol, the identity of the diol or diamine used as the chain extender, and the relative proportion of the diol or diamine used as the chain extender to the free isocyanate groups in the prepolymer (i.e., the reaction product of the long chain diol with the diisocyanate).

Typically, in polyester based elastomeric polyurethanes, the glycol of the polyester is a straight chain glycol having from two to six carbon atoms, such as ethylene glycol, propylene glycol, butylene glycol, pentane diol, hexane diol, and diethylene glycol. Ethylene glycol is preferred, for reasons of cost and availability. Generally, the glycol is in slight excess during the preparation of the polyester. The dicarboxylic acid of the polyester is, typically, a straight chain dicarboxylic acid having from two to 10 carbon atoms, such as oxalic acid, malonic acid, succinic acid, glutaric acid, adipic acid, pimelic acid, suberic acid, azelaic acid, and sebacic acid. For reasons of cost and availability, adipic and succinic acids are preferred. Polyesters prepared from the hereinabove precursors and used for the preparation of polyurethane elastomers, such as poly(ethylene adipate), poly(ethylene succinate), and the like, will have a molecular weight of 1,000 to 4,000, and most frequently of 1,500 to 3,000.

Alternatively, the elastomeric polyurethanes contemplated in this invention may have, as the long chain diol, a polyether. Such polyethers include poly(1,4-oxybutylene), poly(1,2-oxypropylene), and the like. Polyethers suitable for the preparation of elastomeric polyurethanes contemplated may be the polymeric reaction product of epichlorohydrin, ethylene oxide, or propylene oxide, with water, or with a glycol such as ethylene glycol, propylene glycol, butylene glycol, diethylene glycol, or the like. Typically, such polyethers will have a molecular weight of from about 1,000 to about 4,000 and most frequently from about 1,000 to about 2,000.

Elastomeric polyurethanes, having as their long chain diol moiety a polyester or polyether having a molecular weight of 1,000 to 4,000 as described hereinabove are further characterized by the diisocyanate moiety. Typically, the diisocyanate moiety is aryl as in phenylene diisocyanate, tolylene diisocyanate (including toluene diisocyanate), xylene diisocyanate, naphthalene diisocyanate, diphenyl methane diisocyanate, fluorene diisocyanate, and the like. The diisocyanate, however, can also be aliphatic as, for example, methyl diisocyanate, ethyl diisocyanate, propyl diisocyanate, butyl diisocyanate, cyclohexyl diisocyanate, and the like. Most commonly toluene diisocyanate, a mixture of tolylene diisocyanates, is used because of its cost and availability. Typically, such diisocyanate is in excess of the polyester or polyether thereby providing a "prepolymer" having isocyanate and groups.

Such "prepolymers" having an average molecular weight of from about 1,000 to about 100,000, and having a percent available isocyanate content (i.e., available isocyanate content is the number of isocyanate units times the molecular weight of the isocyanate group, divided by the molecular weight of the prepolymer. This is multiplied by 100 to yield a percent available isocyanate content) of from about 2 percent to about 10 percent, are reacted with a short diol curing agent, as a glycol or diamine, to provide an elastomeric polyurethane. Suitable curing agents include aliphatic glycols such as ethylene glycol, 1,3-propanediol, 1,4-butanediol, 1,5-pentanediol, 1,6-hexanediol, and the like. Suitable curing agents also include diamines such as 4,4-diaminodiphenyl methane, 3,3'-dichloro-4,4'-diamino diphenyl methane, benzidine, 3,3'-dimethyl benzidine, 3,3'-dichlorbenzidine, phenylenediamine, and the like.

Such polyurethane elastomers, typically having an average molecular weight of from about 50,000 to about 500,000, a Young's Modulus of from about $10^6$ to about $10^8$ dynes per square centimeter and exhibiting a solubility in liquid chloral of from about 1 weight percent to about 15 weight percent are used in the practice of this invention. Such polyurethane elastomers are typically prepared by methods described in the literature. Polymer blend alloys of polychloral and polyurethanes will typically have from one to 15 weight percent polyurethane elastomer therein based on total weight of the polychloral and polyurethane.

Satisfactory polymer blend alloys are obtained when the dissolved solute elastomer is a polyether. The preferred polyethers will have a modulus of elasticity of from about $10^6$ dynes per square centimer to about $10^8$ dynes per square centimeter. Such polyethers useful as the solute elastomer in the polymer blend alloy of this invention will typically have a molecular weight of from about 1,000 to about 1,000,000. The polyethers contemplated include poly(ethylene oxide), poly(propylene oxide), poly(epichlorohydrin), and copolymers thereof. Particularly good results are obtained when the solute elastomer is a copolymer of epichlorohydrin with either ethylene oxide or propylene oxide. The polyethers contemplated may be prepared by the preparative methods described in the literature, e.g., A. Ledwith and C. Fitzsimmons, "Elastomers from Cyclic Ethers", in *High Polymers, Volume XXIII: Polymer Chemistry of Synthetic Elastomers* (Part I), J. P. Kennedy and E. G. M. Tornquist (editors), Interscience, New York (1968), at pages 377 to 418; N. G. Gaylord and H. F. Mark, *Linear and Stereo Regular Addition Polymers*, Interscience, New York (1959), at pages 305 to 318; and N. G. Gaylord, *Polyethers, Part I*, Interscience, New York (1963), at pages 108 to 157. Polymer blend alloys of polychloral and polyethers will typically have from one to 15 weight percent polyether therein based on total weight of polyepoxide and polychloral.

The chloral composition of this invention is characterized by particularly good physical properties. A bar fabricated from a polymer blend alloy comprising about 3 weight percent of poly styrene-butadiene, an elastomeric polyolefin, exhibited an approximate 60 percent increase in the notched Izod impact strength over a bar of the same dimensions polymerized from essentially pure chloral. A bar fabricated from a blend polymer alloy having about 4.8 weight percent of poly styrene-butadiene, an elastomeric polyolefin exhibited an approximate 200 percent increase in the notched Izod impact strength over a similar bar fabricated from substantially pure polychloral. A bar fabricated from a blend polymer alloy having about 3.0 weight percent of poly(epichlorohydrin), an elastomeric polyether, exhibited an approximate 200 percent increase in notched Izod impact strength over a bar of similar dimensions fabricated from substantially pure polychloral. Bars fabricated from a blend polymer alloy having about 10 weight percent polyurethane exhibited an approximate 250 percent to 350 percent increase in notched Izod impact strength over a bar of similar dimensions fabricated from substantially pure polychloral.

Increases in such physical properties as impact resistance and tensile strength appear with the presence of only small amounts of elastomer in the solid polymer blend alloy, for example, such effects first appear with less than 1 percent by weight elastomer in the solid polymer blend alloy.

The polychloral polymer blend alloy composition of this invention is further characterized by its insolubility in typical organic solvents such as acetone, methylene chloride, tetrahydrofuran, dimethyl formamide, and ethanol. It is also immune to attack from mineral acids such as sulfuric acid phosphoric acid, nitric acid and hydrochloric acid.

The polychloral composition of this invention is self-extinguishing. That is, when an object fabricated from the polychloral composition of this invention is subjected to an open flame, charring occurs. However, when the flame is withdrawn, the charring ceases and the charred surface may be wiped clean. While good results are obtained with all contemplated elastomers, particularly good results are obtained when the elastomer is itself a chlorine compound, such as chloroprene or poly(epichlorohydrin).

Useful articles having good impact resistance, tensile strength, and chemical resistance, and also having self-extinguishing characteristics, may be fabricated from the choral-elastomer blend polymer alloy of this invention. Such articles may be fabricated by rolling, machining, or casting. For example, lightweight gears, exhibiting self-extinguishing properties may be prepared by machining the chloral composition of this invention. These gears may be put to use in applications where a tough, lightweight, self-extinguishing gear is needed, as in small electrical apparatus, or the like. Additionally, lightweight structural members may be prepared from the polychloral composition of this invention. Tank linings that are particularly resistant to mineral acids and other solvents may also be provided by the polychloral of this invention.

In another exemplification, the polychloral composition of this invention may be foamed, yielding a high-strength, low density, self-extinguishing material. This material may be utilized as a thermal insulation.

The polychloral of this invention is prepared by polymerizing monomeric chloral in the presence of a dissolved second polymer, typically an elastomer. Satisfactory results are obtained when the weight percent of the elastomer in the liquid composition based on the total weight of the monomeric chloral and the elastomeric polymer in the liquid composition is from about 1 percent to about 15 percent. The upper limit is the solubility of the elastomer in the monomeric chloral. At concentrations above the solubility of the elastomer in monomeric chloral, a second phase appears. The second phase appears as droplets or globules of the elastomer within the liquid chloral. Upon polymerization of the chloral, these droplets or globules will be present as a second phase in the polychloral elastomer polymer blend alloy phase. This second phase is not deleterious, and compositions having two phases, one of which is essentially a polymer blend alloy phase, and the other of which is essentially an elastomer phase are contemplated by this invention.

The maximum tolerable concentration above which a second phase appears in the liquid composition depends upon the solubility in chloral of the specific elastomer utilized. It is likely that the concentration depends particularly on the degree of polymerization of the elastomer, the miscibility of the elastomer with chloral, and the molecular weight, configuration, and steric properties of the repeating unit present in the elastomer.

The polymerization of chloral in the presence of a dissolved elastomer may be carried out either using chloral as the solvent or in the aprotic solvent. When a solid product cast in a shape is the desired result of the polymerization reaction, the polymerization is preferably carried out with chloral as the solvent, yielding a solution of the elastomer in chloral. However, a solvent that is both inert and aprotic may be used. By an inert solvent is meant a solvent that is chemically inert; that is, a solvent that is substantially non-reactive with the chloral, the elastomers and the initiator under the conditions of the polymerization. By an aprotic solvent is meant a solvent that is incapable of hydrogen bonding, and that cannot transfer a proton to the growing polymer chain. Such solvents may be characterized by the absence of hydrogen-nitrogen, hydrogen-sulfur, or hydrogen-oxygen bonds. Additionally, the solvent should remain in the liquid state over the temperature range encountered in the process, i.e., from about −78° C. to about 40°C.

The preferred solvents are aromatic and aliphatic hydrocarbons. In order to remain liquid over the entire reaction temperature range, the aliphatic hydrocarbons should have from four to seven carbon atoms. Suitable aliphatic hydrocarbons include pentane, hexane, heptane, and cyclohexane. Suitable aromatic hydrocarbons include benzene, toluene, and cumene. Chlorinated aromatic hydrocarbons may also be used.

When a foamed product is desired, propane, butane, pentane, or any low-boiling aprotic, inert solvent may be used as the reaction solvent. Typically to obtain a foamed product the reaction mixture will be more than 50 percent by weight solvent, and may be 70 to 80 percent by weight solvent. The low-boiling solvent is boiled off, allowed to evaporate, or removed by vacuum after polymerization, thereby yielding a foamed product having a density of from about 0.4 gram per cubic centimeter to about 0.6 gram per cubic centimeter. By way of comparison, the typical non-foamed product will have a density of from about 1.6 grams per cubic centimeter to about 2.0 grams per cubic centimeter.

The polymerization is initiated by a suitable polymerization initiator. While either anionic or cationic polymerization initiators may be used, anionic initiation is preferred. Suitable anionic initiators include compounds of Group VA elements, oniums, and compounds of Group IA, IIA, and IIIA metals.

The class of anionic polymerization initiators comprising tertiary organic compounds of elements of Group VA of the periodic table, such as amines and phosphines, has the empirical formula $QR_3$ where Q represents nitrogen, phosphorus, arsenic, antimony or bismuth, and R is a hydrocarbyl group containing from one to 18 carbon atoms. The R's may be alike or different. The R's may also be taken together to indicate the hydrocarbon part of a cyclic 5- to 7- membered ring system in which Q is a heteroatom as in pyridine or in substituted pyridines such as trimethylpyridine, and quinoline, or triethylene diamine, and the alkyl, aryl, and benzo derivatives of such compounds. The hydrocarbyl groups may be alkyl as in methyl, ethyl dodecyl, and octadecyl. They may also be alkenyl as in 9-octadecenyl, or aryl as in phenyl, naphthyl, anthryl, and benzanthryl. Additionally, the hydrocarbyl group may be cycloalkyl as in cyclopropyl, cyclopentyl, cyclohexyl, and cycloheptyl. The hydrocarbyl group may also be aralkyl as in benzyl and phenethyl, alkaryl as in tolyl and xylyl and the like. Triphenyl phosphine is exemplary of this category of anionic initiators.

The second suitable class of anionic polymerization initiators are the oniums. The oniums include ammonium, phosphonium, and sulfonium halides, hydroxides, alkoxides, thioalkoxides, carboxylates, cyanides, cyanates, thiocyanates, and azides. The onium cations may be hydrocarbyl substituted, the hydrocarbyl groups being the same as those described for the amines and phosphines.

The third class of anionic initiators are compounds of Group IA, Group IIA, and Group IIIA metals. Included within this class are hydrides, hydroxides, fluorides, alkyls, alkoxides, carboxylates, cyanates, thiocyanates, cyanides, and azides. Lithium tert-butoxide, and diethyl zinc are exemplary of this class of initiator.

Only an initiating amount of the anionic initiator is used. This will be, typically, from about 0.001 weight percent initiator to about 3 weight percent initiator based on weight of chloral. When the initiator is lithium tert-butoxide, satisfactory results are obtained when the concentration of initiator is from 0.001 weight percent to about 0.5 weight percent. When the initiator is triphenyl phosphine, satisfactory results are obtained when the concentration of the initiator is from about 0.1 weight percent to about 3.00 weight percent.

When the polymerization is anionically initiated, best results are obtained if the reactants are substantially anhydrous. Water in the system is a chain terminator, resulting in a poor product characterized by low conversions and short polymer chains.

Chloral, after standing exposed to the atmosphere combines with the moisture in the air to form chloral hydrate. Monomeric chloral as commercially obtained typically contains the chloral hydrate so formed. Therefore, it is necessary to dehydrate the chloral hydrate (or the chloral hydrate contaminated chloral) in order to obtain a suitable starting material.

Chloral may be dehydrated in several ways. In one method the chloral is distilled in the presence of a dehydrating agent such as phosphorous pentoxide or magnesium sulfate and then the distillate is distilled again thereby providing substantially anhydrous chloral. Alternatively, the chloral can be contacted with anhydrous magnesium perchlorate, filtered, and distilled, thereby providing substantially anhydrous chloral.

When the polymerization is anionically initiated, it is advisable that the reaction be carried out under an inert gas blanket. Suitable inert gas blankets include nitrogen, argon, and helium. Nitrogen is preferred because of its lower cost and ready availability.

The anionic polymerization of chloral is characterized by the existence of a temperature, called the ceiling temperature, above which polymerization will not occur. This temperature is defined as the temperature at which the free energy of polymerization is zero. The ceiling temperature is a function of the solvent, the second polymer, and the concentrations of all the components of the liquid composition. The ceiling temperature is typically from about 45°C. to about 50°C., although little polymerization occurs until the temperature of the reaction is more than about 2°C. below the ceiling temperature.

The liquid composition of chloral, the second polymer, the initiator, and the solvent, if any, is maintained above the ceiling temperature until such time as intimate mixing of the reactants is attained. Thereafter the polymerization is begun by lowering the temperature of the reactants below the ceiling temperature.

The choice of polymerization temperatures and the sequence of these temperatures appear to have an effect on the physical properties of the resulting product. A particularly good product is obtained if the reactants are initially rapidly cooled and held at a low temperature and thereafter heated to an intermediate temperature between the ceiling temperature and the temperature to which the liquid composition was initially cooled. The reactants are preferably held at the first reaction temperature until a solid is formed. When the first reaction temperature is −78°C., the equilibrium temperature of dry ice in acetone, this is typically a period from about 1 minute to about 15 minutes. Thereafter the reactants are heated to an intermediate temperature, typically from about −55°C. to about 0°C. The reaction medium is kept at this intermediate temperature until the reaction has gone substantially to equilibrium. This intermediate temperature is typically about −20°C. when the second polymer is styrene-butadiene rubber, the initiator is triphenyl phosphine, and the initial concentrations in weight percents of the total reaction are 93 percent chloral, 5 percent styrene-butadiene rubber, and 2 percent initiator.

This pattern of reaction temperatures seems to yield particularly good results because the degree of polymerization appears to vary negatively with the temperature; that is, the highest degrees of polymerization are obtained at low temperatures. The rate of reaction, however, is low at low temperatures, appears to reach a maximum at intermediate temperatures, and thereafter appears to become lower with higher temperatures. The temperature at which the higher rates of reaction occur appears to be a function of the solvent, if any, the second polymer, the initiator, and the concentrations thereof. However, satisfactory results may also be obtained if the temperature of the reaction is maintained substantially constant.

Thereafter the reaction medium is heated to room temperature and may be subjected to a vacuum. The purpose of the vacuum treatment is to remove any monomeric chloral remaining unpolymerized as well as any solvent present.

According to one exemplification of this invention, a tough, corrosion-resistant, self-extinguishing surface may be applied to a polymeric member. Particularly good results may be obtained when the polymer used in fabricating the member exhibit some solubility in liquid monomeric chloral. The member, fabricated from, for example, polyurethane, polyolefin, or polyepoxide materials, is treated with monomeric liquid chloral. This may be accomplished by brushing or spraying the monomeric, liquid chloral onto the member or by any other method. After some dissolving or swelling of the member by the chloral, an initiator is added to the chloral, and the temperature of the chloral on the member is lowered below the ceiling temperature of the chloral. The resulting polychloral surface is particularly well bonded to the member.

The following specific examples are illustrative:

EXAMPLE I

Polychloral was prepared from Matheson, Coleman and Bell practical grade chloral.

The chloral was distilled from phosphorus pentoxide in a four foot packed column packed with glass helices. This distillation was conducted under nitrogen, at standard atmospheric pressure of 14.7 pounds per square inch, and at a temperature of about 96°C. to about 96.5°C.

The chloral was then distilled again, under a nitrogen atmosphere at standard atmospheric pressure. By this method a substantially anhydrous monomeric chloral was obtained.

Seventy-five (75.0) grams of the chloral so obtained were placed in a round bottom flask. To this liquid chloral was added by a syringe 1.50 grams of triphenyl phosphine initiator in 1.50 grams of toluene. This was carried out under a nitrogen atmosphere at 60° Centigrade, a temperature above the ceiling temperature. Thereafter, the reactants, still under a nitrogen blanket, were transferred to molds which were 7 millimeters by 14 millimeters by 150 millimeters rectangular test tubes. The molds were cooled below the ceiling temperature. This was accomplished by immersion in an acetone-dry ice bath until solid polymer appeared. The molds containing the reaction mixture, still under a nitrogen blanket, were immersed in a bath at minus 20° Centigrade for 2 hours and then in a bath at 0° Centigrade for 10 hours. Finally, the molds containing the reaction mixture, still under a nitrogen blanket, were allowed to stand at room temperature for 3 days. The product was then removed from the mold and subjected to vacuum treatment at a vacuum of $10^{-1}$ millimeter of mercury at 45° Centigrade for 24 hours. The resulting polychloral bars measured 7 millimeters by 14 millimeters by 110 millimeters. The bars were cut to the proper size and subjected to a notched Izod impact test (according to the procedure described in ASTM Standard D-256-56, *Impact Resistance of Plastics and Electrical Insulating Materials*). The impact strength was 0.39 foot pounds per inch of notch.

EXAMPLE II

A polychloral-polyepichlorohydrin polymer blend alloy was prepared from Matheson, Coleman and Bell practical grade chloral and B. F. Goodrich Co. "Hydrin-100". "Hydrin-100" is a homopolymer of epichlorohydrin having a molecular weight of from about 1 million to about 2 million.

The chloral was distilled as described in Example I to obtain a substantially anhydrous monomeric chloral.

The elastomer, "Hydrin-100" polyepichlorohydrin manufactured by the B. F. Goodrich Company was obtained as a commercial, pressed rubber bale. The bale was comminuted by cutting the bale into chunks, and then manually crushing the chunks of elastomers between the fingers.

Six and three-quarters grams of the comminuted elastomer were added to 225 grams of chloral in a round bottom flask. To this liquid composition were added 4.50 grams of triphenyl phosphine initiator in 4.50 grams of toluene. This was carried out under a nitrogen atmosphere at 60° Centigrade, a temperature above the ceiling temperature. Thereafter, the reactants, still under a nitrogen blanket, were transferred to molds, polymerized and treated as described in Example I hereinabove. The resulting polychloral polyepichlorohydrin polymer blend alloy bars measured 7 millimeters by 14 millimeters by about 120 millimeters. The bars were subjected to a notched Izod impact test as described in Example I hereinabove. The impact strength was 0.81 foot pounds per inch of notch.

EXAMPLE III

A polychloral-polyurethane polymer blend alloy was prepared from Matheson, Coleman and Bell practical grade chloral and General Tire and Rubber Company "Genthane-S" polyurethane rubber.

The chloral was distilled as described in Example I hereinabove to obtain a substantially anhydrous monomeric chloral. The elastomer, "Genthane-S" polyurethane manufactured by General Tire and Rubber Co. was obtained as a commercial, pressed rubber bale. The bale was comminuted by cutting the bale into chunks and then manually crushing the chunks of elastomer between the fingers.

Twenty-five grams of the comminuted elastomer were added to 225 grams of chloral in a round bottom flask. To this liquid composition were added 4.50 grams of triphenyl phosphine initiator in 4.50 grams of toluene. This was carried out under a nitrogen atmosphere at 60° Centigrade, a temperature above the ceiling temperature. Thereafter, the reactants, still under a nitrogen blanket, were transferred to molds, polymerized, and treated as described in Example I hereinabove. The resulting bars, measuring 7 millimeters by 14 millimeters by 120 millimeters, were subjected to a notched Izod impact test (according to the procedure described in Example I hereinabove). The impact strength was 1.44 foot pounds per inch of notch.

EXAMPLE IV

A polychloral-polyurethane polymer blend alloy was prepared from Matheson, Coleman and Bell practical grade chloral and polyurethane.

The chloral was distilled as described in Example I hereinabove to obtain a substantially anhydrous monomeric chloral.

The polyurethane elastomer was prepared according to the procedure described in *Preparative Methods of*

*Polymer Chemistry*, W. R. Sorenson and T. W. Campbell, Interscience Publishers, Inc., New York (1961), pp. 134–135. Four hundred eighty-four grams of WITCO Chemical Co. "Form REZ F7-67" poly(propylene adipate) having an approximate gram molecular weight of 2,000 and a hydroxyl number of 58.3) were placed into a flask equipped with a stirrer and a nitrogen inlet tube reaching to the bottom of the flask. The temperature in the flask was raised to 120°C. by means of an electric resistance heater. The poly(propylene adipate) was stirred, and a stream of nitrogen was passed slowly over the poly(propylene adipate). Fifty-nine grams of diphenylmethane-4,4'-diisocyanate were added to the polyester. The mixture was stirred vigorously at 120°C. for 40 minutes and then cooled under nitrogen. The resulting product was a white elastomer having an inherent viscosity of about 0.98 in N-methylpyrrolidone (0.05 weight percent, at 25° Centigrade). This polyurethane was comminuted by cutting the material into chunks, and by manually crushing the chunks of elastomer between the fingers.

Twenty-five grams of the comminuted elastomer were added to 225 grams of chloral in a round bottom flask. To the liquid composition were added 4.50 grams of triphenyl phosphine initiator in 4.5 grams of toluene. This was carried out under a nitrogen atmosphere 60° Centigrade, a temperature above the ceiling temperature (which is reported to be 50° Centigrade in the literature). Thereafter, the reactants, still under a nitrogen blanket, were transferred to glass molds, polymerized, and treated as described in Example I hereinabove. The resulting polychloral-polyurethane bars, measuring 7 millimeters by 14 millimeters by about 120 millimeters, were subjected to a notched Izod impact test (according to the procedure described in Example I hereinabove). The impact strength was 1.08 foot pounds per inch of notch.

EXAMPLE V

A polymer blend alloy having polychloral and a polystyrene-polybutadiene copolymer as its constituents was prepared from Matheson, Coleman and Bell practical grade chloral and Phillips Petroleum Company's "SBR-1500", a styrene-butadiene copolymer 77.5 weight percent styrene, 22.5 weight percent butadiene and having a molecular weight of about 180,000.

The chloral was distilled as described in Example I hereinabove to obtain a substantially anhydrous monomeric chloral.

The elastomer, "SBR-1500" styrene-butadiene copolymer, manufactured by the Phillips Petroleum Company, was obtained as a commercial, pressed rubber bale. The bale was comminuted by cutting the bale into chunks and then manually crushing the chunks of elastomer between the fingers.

A liquid composition of 4.9 grams of the comminuted elastomer and 165.0 grams of chloral was prepared in a round bottom flask. To the liquid composition were added 2.50 grams of triphenyl phosphine initiator in 2.50 grams of toluene. This was carried out under a nitrogen atmosphere at 60° Centigrade, a temperature above the ceiling Thereafter, thereafter, the reactants, still under a nitrogen blanket, were transferred to glass molds, polymerized, and treated as described in Example I hereinabove. The resulting polychloral poly(styrene-butadiene) bars, measuring 7 millimeters by 14 millimeters by about 120 millimeters, were subjected to a notched Izod impact test (according to the procedure described in Example I hereinabove). The impact strength was 0.65 foot pounds per inch of notch.

EXAMPLE VI

A polymer blend alloy having polychloral and a copolymer of styrene and butadiene as its constituents was prepared from Matheson, Coleman and Bell, practical grade chloral and Phillips Petroleum Company's "SBR-1500".

The chloral was distilled, as described in Example I hereinabove, to yield a substantially anhydrous monomeric chloral.

A liquid composition of 8.8 grams of the comminuted elastomer and 175.0 grams of chloral was prepared in a round bottom flask. To this liquid composition were added 3.50 grams of triphenyl phosphine initiator in 3.50 grams of toluene. This was carried out under a nitrogen atmosphere at 60° Centigrade, a temperature above the ceiling temperature. Thereafter, the reactants, still under a nitrogen blanket, were transferred to glass molds, polymerized, and treated as described in Example I hereinabove. The resulting polychloralpoly(styrene-butadiene) bars, measuring 7 millimeters by 14 millimeters by about 120 millimeters, were subjected to a notched Izod impact test (according to the procedure described in Example I, hereinabove) where they showed an impact strength of 1.23 foot pounds per inch of notch.

EXAMPLE VII

A polychloral polymer was prepared from Matheson, Coleman and Bell practical grade chloral.

The chloral was distilled as described in Example I hereinabove to obtain a substantially anhydrous monomeric chloral.

A liquid composition was prepared containing 90 grams of chloral, under a nitrogen blanket, in a round bottom flask. To this liquid composition were added 1.75 grams of triphenyl phosphine initiator, in 1.75 grams of toluene. This was carried out under a nitrogen atmosphere, at 60° Centigrade, a temperature above the ceiling temperature.

Thereafter, the liquid composition still under a nitrogen atmosphere, was transferred to molds. The individual molds were a pair of glass plates separated by spacers. The molds were then immersed in a bath at minus 20° Centigrade for 2 hours and then in a bath at 0° Centigrade for 10 hours. Finally, the molds containing the product, still under a nitrogen blanket, were allowed to stand at room temperature for 3 days. The product was then removed from the mold and subjected to vacuum treatment at a vacuum of $10^{-1}$ millimeters of mercury for 24 hours.

The resulting products, sheets of polychloral had a tensile strength of about 1,985 pounds per square inch, at which point the elongation was 8 percent. The method used for determining the tensile strength was ASTM Standard D-882-67, *Tensile Properties of Thin Plastic Sheeting*.

EXAMPLE VIII

A polychloral-polyurethane polymer blend alloy was prepared from Matheson, Coleman, and Bell, practical grade chloral, and "Genthane-S" polyurethane manufactured by the General Tire and Rubber Co.

The chloral was distilled as described in Example I hereinabove to obtain a substantially anhydrous monomeric chloral.

A liquid composition was prepared by adding 11.6 grams of the comminuted elastomer to 105 grams of chloral, under a nitrogen blanket, in a round bottom flask. To this liquid composition were added 2.0 grams of triphenyl phosphine initiator, in 2.0 grams of toluene. This was carried out under a nitrogen atmosphere, at 60° Centigrade, a temperature above the ceiling temperature.

Thereafter, the reactants, still under a nitrogen blanket, were transferred to molds, polymerized, and treated as described in Example VII, hereinabove. The resulting products, sheets of a blend of polychloral and polyurethane, had a tensile strength of about 2,130 pounds per square inch, at which point the elongation was 8 percent, determined as described in Example VII hereinabove.

EXAMPLE IX

A polychloral-polyurethane polymer blend alloy was prepared from Matheson, Coleman and Bell, practical grade chloral, and polyurethane.

The chloral was distilled as described in Example I hereinabove, to yield a substantially anhydrous, monomeric chloral.

The polyurethane elastomer was prepared according to the procedure described in Example IV hereinabove.

A liquid composition was prepared by adding 11.6 grams of elastomer so prepared to 105.0 grams of chloral, under a nitrogen blanket, in a round bottom flask. To this liquid composition were added 2.0 grams of triphenyl phosphine initiator, in 2.0 grams of toluene. This was carried out under a nitrogen atmosphere, at 60° Centigrade, a temperature above the ceiling temperature.

Thereafter, the liquid composition, still under a nitrogen blanket, was transferred to molds, polymerized, and treated, as described in Example VII hereinabove.

The resulting product, sheets of polychloral had a tensile strength of about 2,790 pounds per square inch, at which point the elongation was 5 percent, determined as described in Example VII hereinabove.

EXAMPLE X

A polychloral-poly(styrene-butadiene) polymer blend alloy was prepared from Matheson, Coleman and Bell practical grade chloral, and Phillips Petroleum Co., "SBR-1500", a copolymer of butadiene and styrene.

The chloral was distilled as described in Example I hereinabove to yield a substantially anhydrous monomeric chloral.

A liquid composition was prepared by adding 4.75 grams of the comminuted elastomer to 90 grams of chloral, under a nitrogen blanket, in a round bottom flask. To this liquid composition were added 1.75 grams of triphenyl phosphine initiator, in 1.75 grams of toluene. This was carried out under a nitrogen atmosphere, at 60° Centigrade, a temperature above the ceiling temperature.

Therefore, the reactants still under a nitrogen blanket, were transferred to molds, polymerized, and treated as described in Example VII hereinabove.

The resulting products, sheets of a blend of polychloral and poly(styrene-butadiene) had a tensile strength of about 5,080 pounds per square inch, at which point the elongation was 10 percent, determined as described in Example VII hereinabove.

EXAMPLE XI

A polychloral-polyepichlorohydrin polymer blend alloy was prepared from Matheson, Coleman, and Bell practical grade chloral, and "Hydrin 100", a homopolymer of epichlorohydrin having a molecular weight of from about 1 million to about 2 million monomeric units, manufactured by the B. F. Goodrich Company.

The chloral was distilled as described in Example I, hereinabove to yield a substantially anhydrous monomeric chloral.

A liquid composition was prepared by adding 2.8 grams of the comminuted elastomer to 90.0 grams of chloral, under a nitrogen blanket, in a round bottom flask. To this liquid composition were added 1.75 grams of triphenyl phosphine initiator, in 1.75 grams of toluene. This was carried out under a nitrogen atmosphere, at 60° Centigrade, a temperature above the ceiling temperature.

Thereafter, the reactants, still under a nitrogen blanket, were transferred to molds, polymerized, and treated as described in Example VII hereinabove.

The resulting product, sheets of a blend of polychloral and polyepichlorohydrin had a tensile strength of about 4,880 pounds per square inch, at which point the elongation was 10 percent, determined by the method described in Example VII hereinabove.

Although this invention has been described above with respect to certain specific examples and illustrative embodiments, it is not intended that it be so limited thereby except insofar as it appears in the accompanying claims.

We claim:

1. A single phase polymer blend alloy comprising from about 85 to about 99 weight percent polychloral homopolymer and having

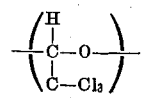

repeating units and from about 15 weight percent to about 1 weight percent of an elastomer originally having a Young's Modulous of from $10^6$ to $10^8$ dynes per square centimeter chosen from the group consisting of polyethers, polyolefins, and polyurethanes.

2. The polymer blend alloy of claim 1 wherein the elastomer comprises a polyolefin.

3. The polymer blend alloy of claim 1 wherein the elastomer comprises a polyurethane.

4. The polymer blend alloy of claim 1 wherein the elastomer comprises a polyether.

5. A composition of matter comprising from about 85 to about 99 weight percent polychloral homopolymer having

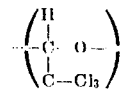

repeating units and from about 15 percent to about 1 weight percent of an elastomer, originally having a Young's Modulous of from $10^6$ to $10^8$ dynes per square centimeter chosen from the group consisting of polyethers, polyolefins, and polyurethanes, the said composition of matter being a single phase at 1,000 magnification.

6. The composition of claim 5 wherein the elastomer is a polyolefin.

7. The composition of claim 5 wherein the elastomer is a polyurethane.

8. The composition of claim 5 wherein the elastomer is a polyether.

9. A process for polymerizing chloral and forming a composition containing from about 85 to about 99 weight percent of a polychloral homopolymer having

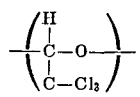

repeating units and from about 15 to about 1 weight percent of an elastomer in a single phase, which process comprises the steps of:
  dissolving an elastomer chosen from the group consisting of polyethers, polyolefins, and polyurethanes, and having a Young's Modulous of from $10^6$ to $10^8$ dynes per square centimeter and a solubility in liquid chloral of greater than 1 weight percent, and an initiator, in chloral, at a temperature above the ceiling temperature of the resulting liquid composition; and
  cooling said liquid composition below the ceiling temperature of the said liquid composition.

10. The process of claim 9 wherein the liquid composition is cooled to a first temperature below the ceiling temperature of the said liquid composition and then heated above the said first temperature but below the said ceiling temperature.

11. The process of claim 9 wherein the initiator is an anionic initiator selected from the group consisting of tertiary organic compounds of Group VA elements, oniums, and compounds of Group IA, Group IIA, and Group IIIA metals.

12. The process of claim 9 wherein the elastomer is polyolefin.

13. The process of claim 9 wherein the elastomer is a polyurethane.

14. The process of claim 9 wherein the elastomer is a polyether.

15. The process of claim 9 wherein the liquid composition comprises a solvent selected from the group consisting of butane and pentane.

16. A process for preparing a chloral homopolymer having

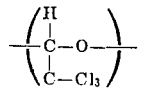

repeating units which comprises polymerizing chloral in the presence of a solution of an elastomer having a Young's Modulous of from $10^6$ to $10^8$ dynes per square centimeter chosen from the group consisting of polyethers, polyolefins, and polyurethanes.

* * * * *